July 27, 1965 A. ACHAMMER 3,197,023
SHIFTING DEVICE ON TRANSPORT VEHICLES
Filed April 9, 1963 3 Sheets-Sheet 1
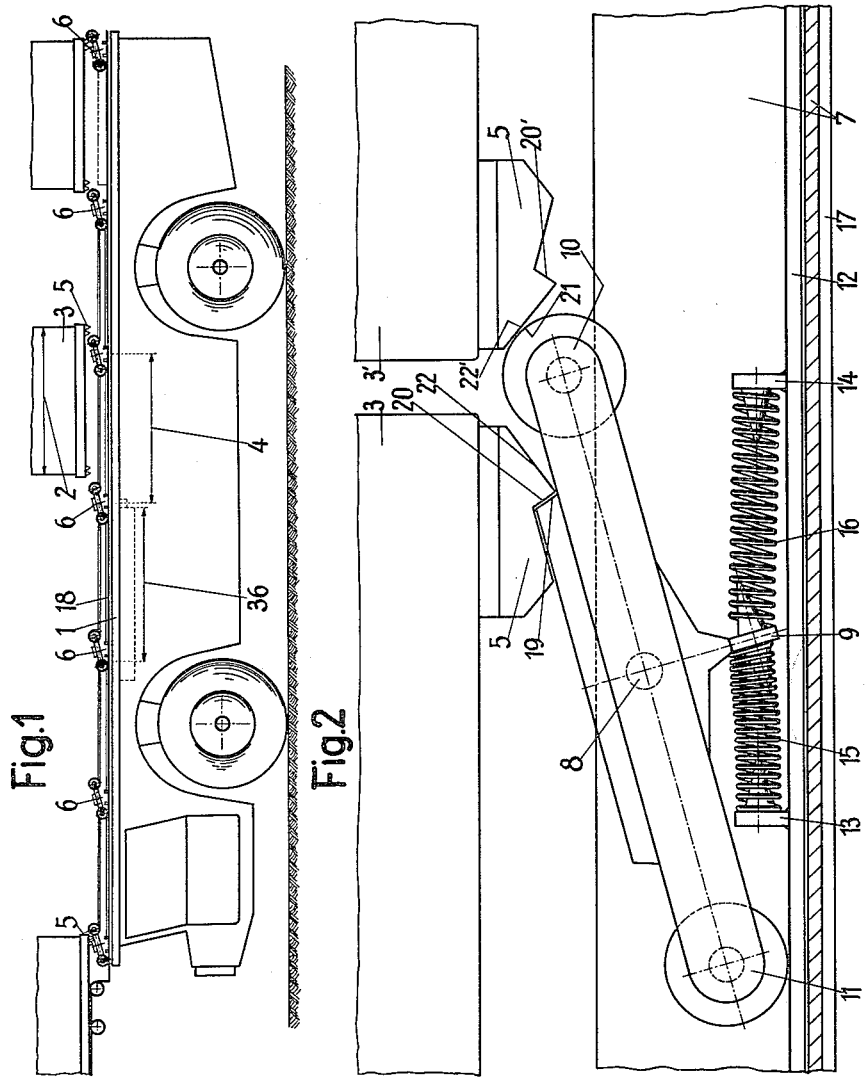

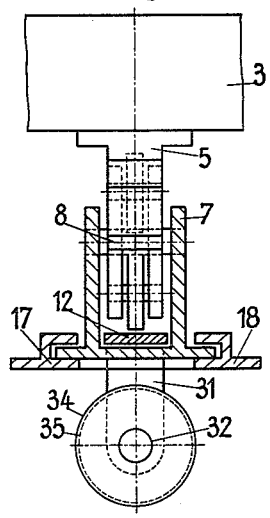
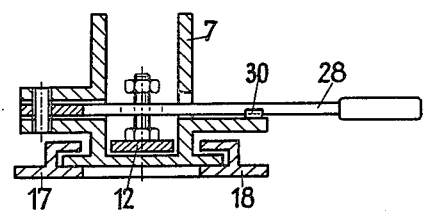
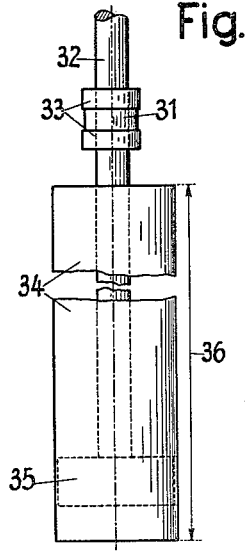
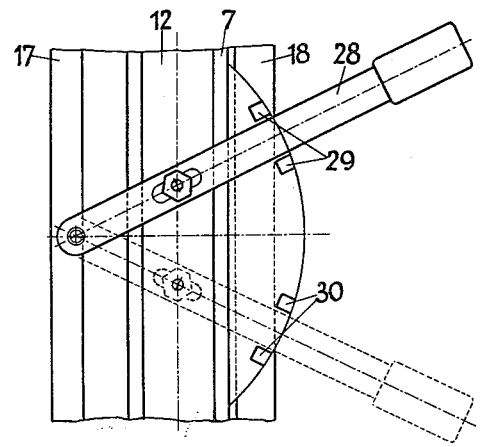

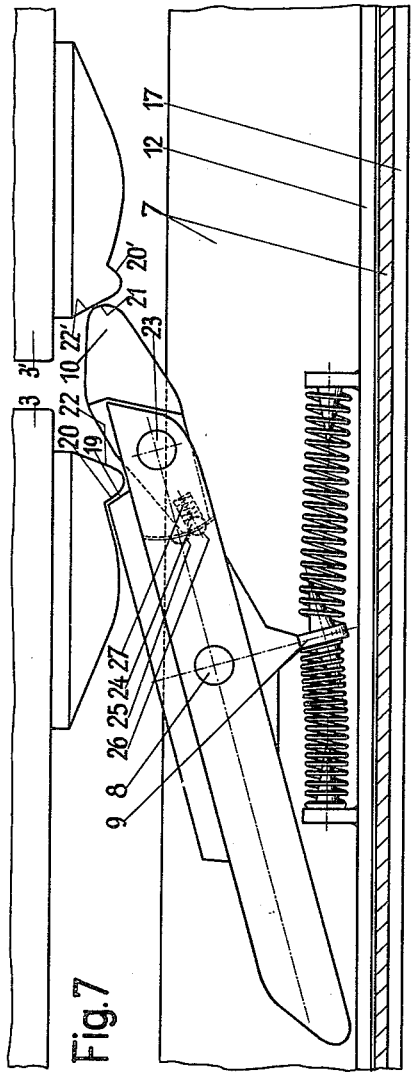
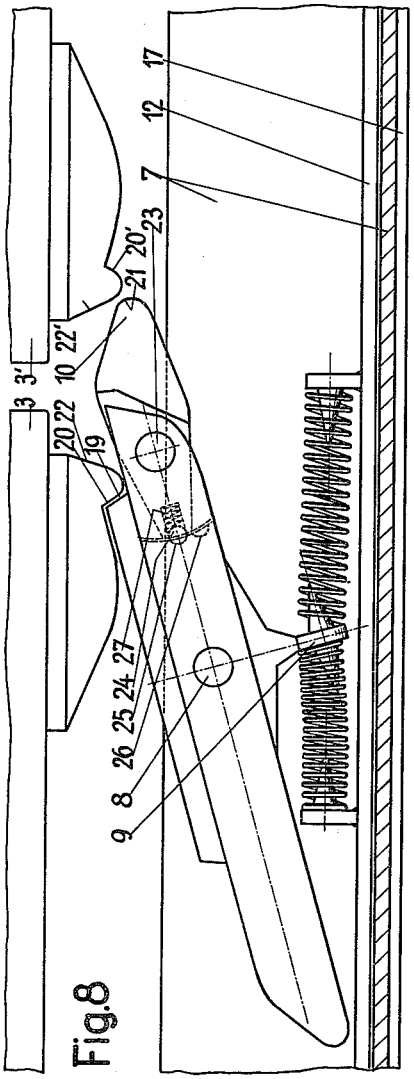

United States Patent Office

3,197,023
Patented July 27, 1965

3,197,023
SHIFTING DEVICE ON TRANSPORT VEHICLES
Alfred Achammer, 106 Schneeburggasse,
Innsbruck, Austria
Filed Apr. 9, 1963, Ser. No. 271,786
Claims priority, application Austria, Apr. 28, 1962,
A 3,495/62
12 Claims. (Cl. 198—221)

The invention relates to a shifting device, particularly for standardized containers on transport vehicles. The term standardized container is not restricted to standardized containers as such, but includes also palets and goods or packings for goods standardized to definite dimensions.

The automation of the conveyance of goods, particularly for the delivery transport, makes it necessary to move such standardized containers onto transport vehicles, to displace them on the vehicle platform and to move them off beyond the vehicle platform.

According to the invention, this task is performed by transport slides provided on the transport vehicle with distances corresponding in their dimension to the length of the standardized container; these slides can be shifted together and interact during the shifting at least indirectly with stops provided on the standardized containers. According to a further characteristic of the invention it is an advantage, if the transport slides are constructed— in order to enable their applicability in either of the two directions of displacement—as catch rockers supported by joints in a common sliding carrier, these rockers having an actuating attachment projecting from their two-armed lever for a change-over mechanism effecting the catch position of the one or the other lever end. According to a further feature of the invention, each change-over mechanism may consist of a spring slide supported displaceably in the sliding carrier and provided with spring buffers and of compression springs inserted between these buffers and the actuating attachment of each catch rocker.

Further details of the invention are explained based on the embodiments represented in the drawing; the invention is, however, not restricted to these embodiments.

FIG. 1 shows the complete device in a transport vehicle in longitudinal view;

FIG. 2 represents a possible construction of the most important part of the invention in longitudinal view;

FIGS. 7 and 8 show an alternative of the same part in two positions, equally in longitudinal views;

FIGS. 3 to 6 represent other details of the invention, FIGS. 3 and 5 being cross sections, FIGS. 4 and 6 being plan views.

According to FIG. 1, several transport slides 6 are provided on the transport vehicle 1 with distances 4 corresponding to the length 2 of the standardized container 3, each of these slides being able to act upon stops 5 of the standardized containers 3. In order to be able to use these transport slides 6 in either of the two directions of displacement, as occasion demands, thus to shift the standardized containers to the end of the vehicle or to its front, the transport slides 6 are constructed as catch rockers. They are supported in a common sliding carrier 7 (FIGS. 2, 3, 7, 8) by means of joints 8. Each catch rocker consists of a two-armed lever with lever ends 10, 11 and an actuating attachment 9 projecting from the lever approximately at right angles at the lever joint 8. In the sliding carrier 7 common to all transport slides 6, a number of spring slides 12 of limited displaceability are arranged in correspondence with the number of transport slides 6. Each such spring slide 12 is provided preferably with spring buffers 13, 14 constructed as lugs. Between the actuating attachment 9 of the catch rocker located between the two spring buffers 13, 14 on the one hand and each of the spring buffers 13, 14 on the other hand compression springs 15 and 16, respectively, are inserted. The lead pins preventing these springs from springing off are evident from FIG. 2. The change-over mechanism described secures the two-armed lever in one of two possible tilt positions; in the tilt position represented in FIG. 2, the lever end 10 is in its topmost position, while the other end 11 of the lever occupies the ineffective bottom position.

Each standardized container 3 has stops 5 at both ends. In the embodiments represented, these stops are provided as separate stop bodies each of which is equipped with two stop and recoil faces, respectively. These faces are designated in the drawing as 20, 20' and 22, 22'. The faces 20 and 22' are effective for one direction of displacement and the faces 20' and 22 for the opposite direction of displacement. The faces 20, 20' belong to one stop system and the faces 22, 22' to a second stop system. Moreover, at least one of the lever ends 10, 11 is designed with two stop systems. On the catch rocker represented in FIG. 2, two stop systems are provided for each lever end. In the construction shown in FIG. 2, one stop system has a stop face 19, while the other stop system is realized by a recoil face 21 in the form of a recoil roller. The stop face 20 of the standardized container 3 interacts with the stop face 19 of the lever end 10 of the transport slide 6. But the lever end 10 acts also on the standardized container 3' preceding the standardized container 3 in the direction of displacement, the recoil face 21 of the transport slide, formed as recoil roller, contacting the recoil face 22' of the standardized container 3'. If the transport slide 6 and the catch rocker, respectively, are shifted to the right as shown in FIG. 2, the standardized container 3 is displaced due to the engagement of the stops 19, 20 toward the right—the front—until the recoil face 21 of the lever end 10 abuts on the recoil face 22' of the neighboring container 3' being at rest on the vehicle; thereby, the lever end 10 is pressed downward so that the stop faces 19, 20 are disengaged. The standardized container 3 stops a small distance from the standardized container 3' on the transport vehicle, if suitable dimensioning is provided for the respective interdistance of the stops 19, 20, 21, 22.

While in the construction according to FIG. 2 the recoil face 21 is provided as recoil roller, the FIGS. 7 and 8 show a further embodiment. Here, the recoil face 21 is formed as curved recoil face at a lever end which is not rigidly connected with the two-armed lever; on the contrary, this lever end 10 forms a separate structural part which is connected with the two-armed lever of the catch rocker via a joint 23. Stops are provided to permit only a limited swiveling of the end part 10 on the two-armed lever of the catch rocker. The extreme positions of the end part 10 are guarded by the interaction of a locking ball device 24, 27 with ball grooves 25, 26. In the shift position 26 represented in FIG. 7, the effective lever end of the catch rocker acts by means of the stop 19 on the stop 20 of the standardized container 3 and by means of the front part of the curved recoil face 21 in the sense of a stop on the stop part of the recoil face 22' of the standardized container 3'. Both standardized containers 3, 3' are taken along by the catch rocker in the sense of a forward displacement. By way of example, the foremost standardized container can be discharged in this way from the platform of the transport vehicle to a material-handling platform. In the recoil position 25 shown in FIG. 8, on the contrary, the curved recoil face 21 is deflected with a zone of suitable shape from the respective zone of the recoil face 22' of the standardized container 3' and disengages thus also the stops 19, 20 with respect to the standardized container 3 so that the two standardized containers 3, 3'—as in the embodiment shown in FIG. 2—are arranged on the transport vehicle with the small interdistance desired for their transport position.

If one wants to change the direction of displacement, merely a reversal of the catch rockers into the other tilting position is necessary. Since a discharge of standardized containers from the platform of the vehicle is only practicable for the standardized containers which are foremost in the direction of displacement, it is sufficient, if the first and the last transport slide 6 are equipped with a device as shown, e.g., in FIGS. 7 and 8.

All transport slides 6 (FIG. 1) and their catch rockers, respectively, are supported in the sliding carrier 7 by means of joints 8 (FIGS. 3, 5). For guiding the sliding carrier 7 itself, the guide tracks 17, 18 are provided on the transport vehicle. The spring slides 12 assigned to each individual catch rocker slide in the sliding carrier 7; their extreme positions corresponding to one of the two tilting positions of the catch rocker can be established by an adjusting lever 28 and can be secured by abutments 29, 30 for the adjusting lever 28, as is evident from FIGS. 5 and 6.

The displacement of the sliding carrier 7 can be effected by way of example by a hydraulic device as indicated in FIGS. 3 and 4, FIG. 4 showing in plan view the parts effecting the displacement, the platform of the transport vehicle being lifted off and all structural components which are irrelevant for the displacement of the sliding carrier 7 as such being omitted. The sliding carrier 7 is equipped with a lug 31 which projects downward, e.g., through a slot of the platform of the transport vehicle and is connected with the piston rod 32 of the hydraulic device, for instance, by means of guide disks 33 mounted on this rod. The piston 35 is guided in the usual way in the hydraulic cylinder 34. The representation in FIG. 4 is merely diagrammatic. In practice, the embodiment may be provided with a suitable transmission system so that the length of the hydraulic piston 34 may be kept short.

The displacement stroke 36 of the displacement mechanism may be—according to an advantageous characteristic of the invention—somewhat larger than the distance 4 of the transport slides 6 (FIG. 1) and somewhat smaller than the length 2 of the standardized containers 3. This is done to guarantee that the sliding carrier 7 after having reached one end position defined by one direction of displacement returns in the reverse direction of displacement to a new starting position which ensures that for a repeated application of the device in the first direction of displacement the standardized containers are engaged and taken along due to a correct engagement of the interacting stops at the catch rockers of the transport slides and at the standardized containers.

The explanations of the invention based on the embodiments represented and described were made for the sake of demonstration. They may, however, not be regarded as restrictive for the numerous further possibilities of realizing this invention.

What I claim is:

1. Apparatus for displacing containers of standardized size, each container having a lower surface and including spaced stops on said lower surface, the apparatus comprising: a plurality of transport slides having a spacing substantially equal to the length of each container such that each slide is adapted for cooperating with a separate container, carrier means connected to each of said slides for displacing the slides together, means connected to the carrier means for displacing the same and the slides therewith in opposite directions a distance at least equal to the distance between slides, guide means slidably supporting the carrier means, each slide including means for engaging a stop of a container to displace the container as the slide is displaced such that a container may be advanced over a distance covered by a number of slides by advancing the container with a first slide, then reversing the movement of the slides and then engaging the stop of the container with a successive slide for further advancement, and means supporting each slide from the carrier means for movement between first and second end positions in which such slide is operative for engaging a respective stop of the container to move the container in respective opposite directions.

2. Apparatus as claimed in claim 1 wherein each slide is a lever having opposite ends and centrally supported for pivotal movement between said first and second end positions, the apparatus comprising means holding the lever in each of said positions, and means projecting from the end of each lever for engaging a stop on an adjacent container for releasing the lever from an end position and from the stop of the container with which it is engaged.

3. Apparatus as claimed in claim 2 wherein the means projecting from the end of each lever is a recoil roller which contacts a stop on an adjacent container as the lever is being advanced to rotate the lever and free the same from the stop on the container being advanced whereby a prescribed spacing will be established between the adjacent containers.

4. Apparatus as claimed in claim 2 wherein the means projecting from the end of each lever is a portion with a curved face.

5. Apparatus as claimed in claim 4 comprising means connecting the projecting portion for pivotal movement to the lever between first and second limit positions.

6. Apparatus as claimed in claim 5 wherein the projecting portion has a curvature related to the shape of the stops and the positions established by the said limit positions to engage said stops and in one of said positions to drive the adjacent container upon advancement of the transport slides whereas in the other of the positions the projecting portion will cause the associated lever to undergo pivotal movement and release the stop of the container with which it was engaged, when the projection portion contacts a stop of the adjacent container.

7. Apparatus as claimed in claim 1 wherein each slide is a lever having opposite ends and centrally supported for pivotal movement between said first and second end positions, the apparatus comprising means holding the lever in each of said positions, and actuating means coupled to said lever for moving the lever between said end positions.

8. Apparatus as claimed in claim 7 wherein said actuating means comprises a spring slide for each slide slidable between first and second end positions, and spring means supported by the spring slide and engaging the lever to urge the same towards respective of said end positions in correspondence with the position assumed by the spring slide.

9. Apparatus as claimed in claim 8 wherein said actuating means includes a central actuating attachment on said lever, said spring means comprising spaced abutments on either side of the central attachment constituting spring buffers, and opposed compression springs supported by said buffers and said central actuating attachment.

10. Apparatus as claimed in claim 8 wherein said guide means comprises a guide track, said carrier means comprising a slide carrier supported in said guide track for sliding displacement.

11. Apparatus as claimed in claim 1 wherein the means connected to the carrier means for displacing the same comprises a cylinder and a piston slidable in the cylinder and having a stroke larger than the distance between slides and smaller than the distance between the stops of the standardized containers.

12. Apparatus for displacing containers of standardized size, each container having a lower surface and a stop on said lower surface, the apparatus comprising a plurality of transport slides having a spacing substantially equal to the length of each container such that each slide is adapted for cooperating with a separate container, carrier means connected to each of said slides for displacing the slides together, means connected to the carrier means for displacing the same and the slides therewith in opposite directions a distance at least equal to the distance between slides, guide means slidably supporting the carrier means, each slide including means for engaging a stop of a container to displace the container as the slide is displaced such that a container may be advanced over a distance covered by a number of slides by advancing the container with a first slide, then reversing the movement of the slides and then engaging the stop of the container with a successive slide for further advancement, and means supporting each slide from the carrier means for pivotal movement from an initial position in which the slide is operative for engaging a stop of a container such that the slide may be released from said stop.

References Cited by the Examiner

UNITED STATES PATENTS 2,961,973  11/60  Bozman _____ 104—162

SAMUEL F. COLEMAN, *Primary Examiner.*

ERNEST A. FALLER, *Examiner.*